Patented Aug. 18, 1925.

1,550,137

UNITED STATES PATENT OFFICE.

BENJAMIN HARRISON WRIGHT, OF NEW YORK, N. Y.

POLISH.

No Drawing. Application filed August 5, 1921. Serial No. 490,154.

*To all whom it may concern:*

Be it known that I, BENJAMIN HARRISON WRIGHT, a citizen of the United States, and a resident of the city, county, and State of New York, have invented new and useful Improvements in Polishes, of which the following is a specification.

My invention relates to the production of an improved polish, especially adapted for use upon furniture, automobile bodies, and the like, and the object of my invention is to produce a polish of a more durable and permanent nature than has heretofore been done. The invention consists of the novel process and product herein described.

In detailing the preferred form of my invention, I do not desire to be limited to the process or product particularly described.

I have found that the addition of borax to the usual waxes and oils combined in a polish has the result of making the polish much more durable and permanent.

In order to make a gallon of my polish in the preferred form, I mix together and heat four ounces (4 oz.) of yellow wax, one (1) pint of paraffine oil, and one (1) pint of kerosene oil, with one ounce (1 oz.) of borax. The mixing should be carried out at a temperature of about 135° F. Three quarts (3 qts.) of water, separately heated to about 162–163° F., should then be added, and stirred into the mixture, the whole forming one gallon of the polish as aforesaid.

What I claim as new and desire to secure by Letters Patent is:

1. As a composition of matter, a polish composed of a small amount of borax combined with wax, oil and water.

2. As a composition of matter, a polish composed of the following ingredients in substantially the proportions as specified—

Borax _____ 1 ounce,
Yellow wax _____ 4 ounces,
Paraffine oil _____ 1 pint,
Kerosene oil _____ 1 pint,
Water _____ 3 quarts.

3. The process of making polish, which consists in mixing together and heating wax, oil and borax, and then adding hot water to the mixture.

4. The process of making a polish, which consists of mixing together and heating to about 135° F. wax, oil and borax, and then combining the said mixture with water heated to about 162° F.

5. The process of making polish, which consists in mixing together and heating yellow wax, paraffine oil and borax, and then adding hot water to the mixture, combining the same in the proportions substantially as described.

6. The process of making polish, which consists in mixing together and heating to about 135° F. yellow wax, paraffine oil, kerosene oil and borax, and then combining the said mixture with water heated to about 162° F., combining the same in the proportions substantially as described.

In testimony whereof, I have signed my name to this specification.

BENJAMIN HARRISON WRIGHT.